Sept. 27, 1949.  C. E. POLLARD  2,482,868
FIFTH-WHEEL ASSEMBLY
Filed Nov. 7, 1947  2 Sheets-Sheet 1
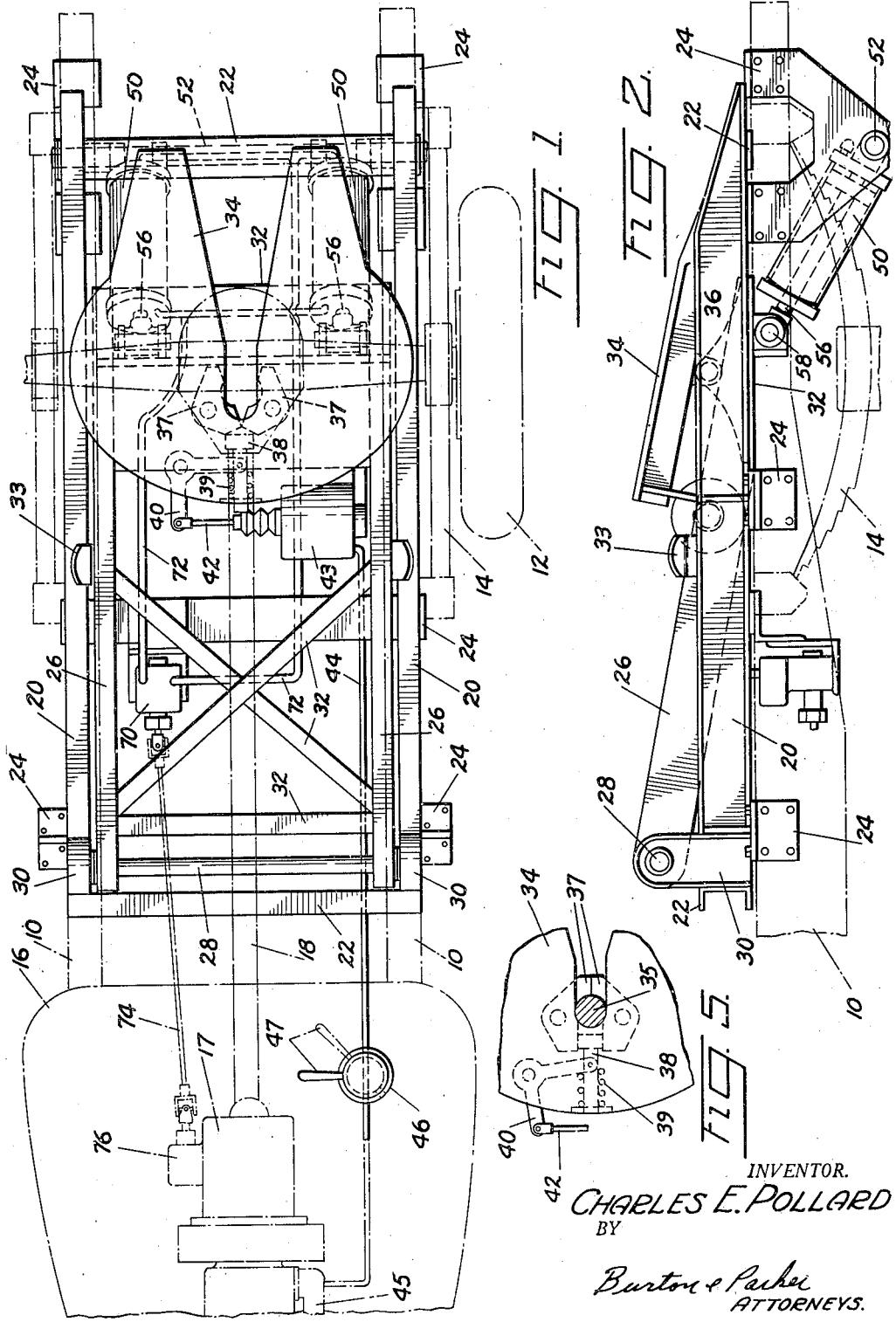
INVENTOR.
CHARLES E. POLLARD
BY
Burton & Parker
ATTORNEYS.

Sept. 27, 1949.   C. E. POLLARD   2,482,868
FIFTH-WHEEL ASSEMBLY
Filed Nov. 7, 1947   2 Sheets-Sheet 2
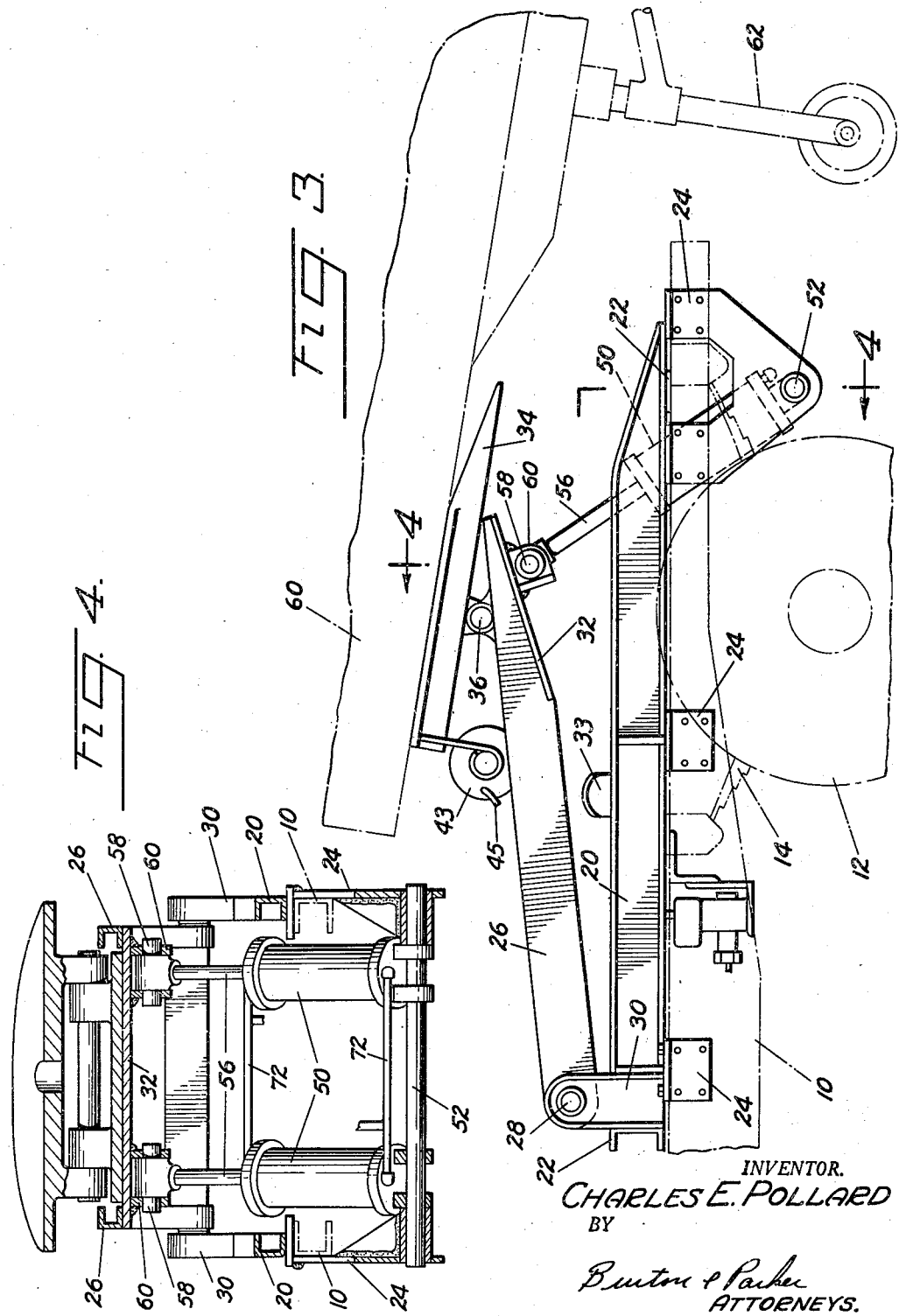
INVENTOR.
CHARLES E. POLLARD
BY
Burton & Parker
ATTORNEYS.

Patented Sept. 27, 1949

2,482,868

UNITED STATES PATENT OFFICE 2,482,868

FIFTH WHEEL ASSEMBLY

Charles E. Pollard, Detroit, Mich.

Application November 7, 1947, Serial No. 784,732

7 Claims. (Cl. 280—33.05)

This invention relates to an improved fifth wheel assembly for a tractor.

An object is to provide an improved fifth wheel assembly which includes fifth wheel mechanism proper, a swingable platform frame for the fifth wheel mechanism proper, hydraulic power mechanism mounted and so coupled with the swingable platform to efficiently raise and lower the platform and to support the same in elevated position and to effectively absorb the shock of moving the load, all combined in a unitary assembly which may be transported as a unit and quickly attached as a unit to any conventional tractor frame.

The fifth wheel assembly comprises an assembly main frame, an assembly sub-frame or platform swingably mounted upon the main frame, a fifth wheel platform pivotally mounted upon the sub-frame, power mechanism carried by the main frame and coupled with the sub-frame to efficiently swingably raise and lower the same, and power mechanism mounted on the assembly and coupled with fifth wheel release mechanism.

The assembly frame is so constructed that it may be quickly attached to or detached from conventional frame structure of a tractor frame without alteration or re-construction thereof. It is adapted for attachment to any conventional tractor frame in a position superimposing the frame, and with its operating mechanism disposed within the frame. The assembly is, therefore, capable of being sold and shipped as a unit adapted for attachment to any conventional tractor by any operator with the use of ordinary tools.

The fifth wheel assembly of this application is an improvement upon the fifth wheel assembly shown and described in my United States Patent No. 2,407,447, dated September 10, 1946.

An important object of this invention is that this improved assembly is so constructed and mounted upon the tractor, and the hydraulic elevator mechanism is so constructed and coupled therewith, that the fifth wheel device proper may be elevated and supported in the elevated position with the exertion of a minimum amount of power and the power mechanism functions in a highly efficient manner to raise such fifth wheel device and to support the same in the elevated position.

Another important object is that the hydraulic power operating mechanism acts upon the swingable platform directly underneath the load carried by the fifth wheel device proper and such platform is not subjected to undesirable load strains and the fifth wheel device proper is disposed, when elevated, slightly ahead of the rear axle of the tractor, whereby the load carried by it is disposed upon both the front and rear wheels of the tractor in an efficient manner.

A meritorious feature of this construction is that the swingable platform is so constructed that the drawbar pull of the tractor transmitted through the pivot mounting of the swingable platform to the fifth wheel mechanism proper is transmitted along a line which does not depart too greatly from a horizontal line and the fifth wheel mechanism proper is not too greatly elevated but occupies a relatively low position when elevated.

A further object is that the construction of the assembly is such that the hydraulic power elevating and supporting mechanism is so mounted upon the tractor and coupled with the assembly that the load of the tractor carried thereby, the draw bar pull, the jar or shock of starting a load, and the shocks incident to movement of the load are effectively cushioned by the hydraulic power elevating and supporting mechanism.

Suitable power mechanism capable of control from the driver's seat is provided to raise and lower the fifth wheel mechanism and the front end of a trailer coupled therewith. The construction is such that when the front end of a trailer is elevated by the fifth wheel mechanism, the trailer may be moved by the tractor from one place to another without the draw-bar load imposing undesirable strains upon the fifth wheel elevating and supporting mechanism.

Power mechanism operable from the driver's seat is provided to release clamping means which normally holds the trailer to the fifth wheel platform of the elevating mechanism of the assembly.

Other objects, advantages and meritorious features will more fully appear from the following specification, claims and accompanying drawings wherein:

Figure 1 is a top plan view of my improved fifth wheel assembly mounted upon the rear end portion of the frame of a tractor.

Figure 2 is a side elevation partly in section of the fifth wheel assembly, shown in Figure 1, taken on the line 2—2 of Figure 1, and showing the fifth wheel assembly in the lowered position.

Figure 3 is a side elevation in the elevated position of the fifth wheel assembly shown in Figure 2, and showing the front end of a trailer coupled therewith.

Figure 4 is a vertical sectional view taken on the line 4—4 of Figure 3.

Figure 5 is a fragmentary plan of the fifth wheel trailer pin engaging jaw mechanism.

This fifth wheel assembly is adapted for convenient attachment to the conventional frame of any tractor. It comprises a unitary assembly of parts which may be shipped as a unit anywhere for attachment to a tractor. It does not have to be tailored to fit the particular tractor to which it is attached. An ordinary garage mechanic can attach the same. This adds materially to its value and utility.

In the various figures of the drawing the rear ends of the side frame members of a tractor frame are indicated at 10. This frame is supported upon road wheels 12 by springs 14. The cab of the tractor is indicated as 16 in dotted outline in Figure 1. The drive-shaft which leads from the transmission 17 to the rear axle is indicated as 18. My fifth wheel assembly comprises an assembly frame including a pair of side frame members 20 held in spaced apart relationship by cross frame members 22. These side frame members 20 are secured to the frame members 10 by angular attachment brackets 24. Three of these brackets are shown on each side in Figure 1. These brackets are adapted to be secured by bolts or the like to the tractor frame 10 to secure the assembly frame thereto, superimposing the tractor frame. The rear brackets are enlarged and bifurcated.

A sub-frame assembly is provided. This sub-frame assembly comprises side frame members 26 which are swingably supported at the front upon an axle 28, which axle is journalled between a pair of standards 30, which standards are mounted upon the assembly frame members 20. This sub-frame 26 is, therefore, swingably supported at its front end to have its rear end raised and lowered to position the sub-frame entirely within the assembly frame 20 as shown in Figure 2, or to elevate its rear end as shown in Figure 3.

The sub-frame side members 26 are channel shaped in cross section, note Figure 4, and are connected together by cross frame members 32 and support a fifth wheel platform as hereinafter described. To guide the sub-frame as it is lowered into the assembly frame there are provided guide plates 33 which flare outwardly at their upper ends as shown.

A fifth wheel platform 34 is pivotally supported at 36 upon the cross plate 32 at the rear end of the sub-frame 26 as shown. This fifth wheel platform is of conventional construction adapted to receive the front end of the trailer. It exhibits the slotted supporting plate shown and a pair of swingable jaws 37 which jaws are adapted to be held by mechanism, including a plunger 38 actuated by a spring 39 to engage a connecting pin 35 of a trailer. An angular lever 40 is pivotally supported to withdraw the plunger against the spring 39 to permit release of the trailer.

This lever is adapted to be actuated through suitable power mechanism including a link 42 connecting the lever with a power device 43, as shown in Figure 1, which power device may be in the form of a vacuum piston and cylinder structure 43 connected by a vacuum line 44 with the manifold 45. A control valve 46 provided with a control handle 47 is provided. Through this power device the lever 40 is adapted to be swung to withdraw the plunger 38 from its position between the jaws 36, as shown in Figure 6, to the position shown in Figure 1, to release the trailer pin 35.

The sub-frame including the fifth wheel platform is adapted to be raised and lowered by power mechanism. This power mechanism includes hydraulic lifting means in the form of a pair of hydraulic cylinders 50 which are pivotally supported upon a shaft 52 journalled between the depending sides of the rear brackets 24 as shown particularly in Figure 4. Within each cylinder is mounted a piston and the piston rod 56 is pivotally coupled at its upper end with the cross frame plate 32 of the sub-frame 26 to raise and lower such sub-frame by journal pins 58 and mountings 60.

Mechanism operable from the driver's seat is provided to control the hydraulic piston and cylinder mechanism. This mechanism is that which is generally shown in my Patent Number 2,407,447, dated September 10, 1946, and comprises hydraulic pump 70, connected by fluid lines 72, with the cylinders 50 to deliver liquid under pressure thereto, or to return liquid therefrom to the pump. This pump may be a conventional gear pump such as is used on dump truck bodies, and may be driven from the transmission gearing through a shaft 74, which extends from the pump to an attachment 76, mounted upon the side of the transmission casing, as shown in Figure 1. This attachment is adapted to be controlled through conventional control mechanism by the driver from the cab of the vehicle.

The front end of a trailer is indicated at 62 in Figure 3. Such trailer is provided with retractible supporting wheels 62. It is also provided with a depending coupling pin 35, (Figure 5) adapted to couple the trailer with the tractor. This pin is adapted to be received between the jaws 37. When the rear end of the tractor is backed underneath the elevated front end of the trailer, the pin enters the slot in the plate 34, and is gripped between the jaws 37.

The fifth wheel platform may be elevated, as shown in Figure 3, to lift the wheeled standards 62 off the ground, and the trailer may then be moved as desired by the tractor. When the trailer has been moved to the proper place, the fifth wheel platform may be dropped through operation of the hydraulic mechanism, and the wheeled standards again support the front end of the trailer. The vacuum power device 43 may be operated to swing the lever 40 to withdraw the plunger 38 to release the jaws so that the coupling pin may be dis-engaged, and the tractor driven away from the trailer.

It will be observed that the hydraulic cylinder mechanism 50 is mounted between the assembly frame 20 and the swingable sub-frame 26 that even when elevated the drawbar pull and the shock of starting a load is taken on the hydraulic cushion of such cylinder mechanism. The draw bar pull is along a line with respect to the hydraulic cylinders which does not impose undesirable strains upon such hydraulic mechanism. The lift of the hydraulic mechanism provides effective leverage and is under the load elevated and the center of the fifth wheel mechanism is slightly forward of the rear axle of the tractor.

What I claim is:

1. Fifth wheel mechanism for a tractor having a frame provided with a rear axle having road wheels and provided with platform pivots spaced forwardly of said axle, a platform superimposing that portion of the frame to the rear of said pivots and hinged at its forward end to said pivots to have its rear end swung above the rear end of the frame or to be lowered to rest thereupon, a fifth wheel coupling device pivotally mounted upon the rear end of the platform to engage and to support the front end of a trailer coupled therewith, said fifth wheel coupling device pivotally coupled with the platform slightly forwardly of the rear axle, hydraulic piston and cylinder mechanism pivotally supported upon the frame to the rear of the rear axle and extending forwardly from its mounting upon the frame overhanging the rear axle and pivotally coupled with said platform substantially directly underneath the mounting of the fifth wheel device upon the platform, said hydraulic piston and cylinder mechanism operable to elevate and to support the rear end of the platform above the frame.

2. A unitary fifth wheel assembly for a tractor having a frame and provided with a rear axle comprising, in combination, an assembly main frame having a pair of side frame members connected by cross pieces, said main frame provided with parts adapted to connect the same to the tractor frame forwardly of the rear axle and rearwardly of the rear axle, a sub-frame pivoted at its front end to the front end of the main frame for swingable movement of its rear end thereabove, a fifth wheel platform pivotally supported upon the rear end of the sub-frame, said fifth wheel platform pivotally mounted on the sub-frame ahead of the rear axle, hydraulic piston and cylinder mechanism pivotally supported upon the assembly frame rearwardly of the rear axle and pivotally coupled with the sub-frame substantially directly under the pivotal coupling of the fifth wheel platform therewith to swingably raise and lower the sub-frame.

3. A unitary fifth wheel assembly for a tractor having a frame provided with side frame members comprising, in combination, an assembly main frame having spaced side frame members, means for detachably connecting the side frame members of the assembly main frame with and superimposing the side frame members of the tractor frame, a sub-frame having side frame members receivable between the side frame members of the assembly frame, said sub-frame pivotally coupled at its front end with the front end of the main frame, a fifth wheel platform pivotally mounted upon the rear end of the sub-frame, guide plates projecting upwardly from the side frame members of the assembly main frame, said guide plates being bent outwardly at their upper ends to guide the sub-frame, hydraulic piston and cylinder mechanism pivoted upon the rear end of the main frame and extending forwardly from such mounting and pivoted to the sub-frame substantially underneath the fifth wheel platform.

4. A unitary fifth wheel assembly for a tractor having a frame provided with side frame members comprising, in combination, an assembly main frame having spaced side frame members, means for detachably connecting the side frame members of the assembly main frame with and superimposing the side frame members of the tractor frame, a sub-frame having side frame members receivable between the side frame members of the assembly frame, means pivotally coupling the sub-frame with the main frame ahead of the rear axle and to the rear of the rear axle including hydraulic piston and cylinder mechanism pivoted to the main frame to the rear of the rear axle and extending forwardly therefrom and pivoted to the sub-frame substantially directly above the rear axle, a fifth wheel platform pivotally mounted upon the sub-frame slightly forwardly of the rear axle and substantially in line with the pivotal connection of the piston and cylinder mechanism with the main frame and with the sub-frame.

5. A unitary fifth wheel assembly for a tractor having a frame provided with side frame members comprising, in combination, an assembly main frame having spaced side frame members, means for detachably connecting the side frame members of the assembly main frame with and superimposing the side frame members of the tractor frame, both ahead of and to the rear of the rear axle, a fifth wheel platform, fifth wheel platform supporting means for raising and lowering the fifth wheel platform including a set of rearwardly extending linkage pivoted to the main frame to the rear of the rear axle and a set of forwardly extending linkage pivoted to the main frame forwardly of the rear axle, said two sets of linkage being pivotally articulated together substantially directly above the rear axle, said fifth wheel platform being pivoted to said supporting means slightly forwardly of the rear axle and above the pivotal articulation of said two sets of linkage.

6. A unitary fifth wheel assembly for a tractor having a frame provided with side frame members comprising, in combination, an assembly main frame having spaced side frame members, means for detachably connecting the side frame members of the assembly main frame with and superimposing the side frame members of the tractor frame both ahead of and to the rear of the rear axle, a fifth wheel platform, fifth wheel platform supporting means for raising and lowering the same including toggle-like mechanism comprising a forwardly extending set of arms pivoted to the main frame forwardly of the rear axle and a rearwardly extending set of arms pivoted to the main frame rearwardly of the rear axle, said fifth wheel platform pivotally coupled with the two sets of arms above and slightly forwardly of the rear axle and substantially on a line with the pivotal mounting of the opposite ends of the rearwardly extending set of arms.

7. A unitary fifth wheel assembly for a tractor having a frame provided with side frame members comprising, in combination, an assembly main frame having spaced side frame members, means for detachably connecting the side frame members of the assembly main frame with and superimposing the side frame members of the tractor frame both ahead of and to the rear of the rear axle, a fifth wheel platform, fifth wheel platform raising and lowering mechanism pivotally coupled with the main frame ahead of the rear axle and pivotally coupled with the main frame rearwardly of the rear axle, the fifth wheel platform being pivotally coupled with said raising and lowering mechanism slightly forwardly of the rear axle in either the raised or the lowered position of said mechanism.

CHARLES E. POLLARD.

REFERENCES CITED

The following references are of record in the file of this patent:

UNITED STATES PATENTS

| Number | Name | Date |
| --- | --- | --- |
| 1,908,987 | Kuhlman | May 16, 1933 |
| 2,407,447 | Pollard | Sept. 10, 1946 |